(No Model.) 3 Sheets—Sheet 1.
J. WALLACE.
HYGROSCOPIC REGULATOR FOR HUMIDIFIERS.
No. 567,209. Patented Sept. 8, 1896.
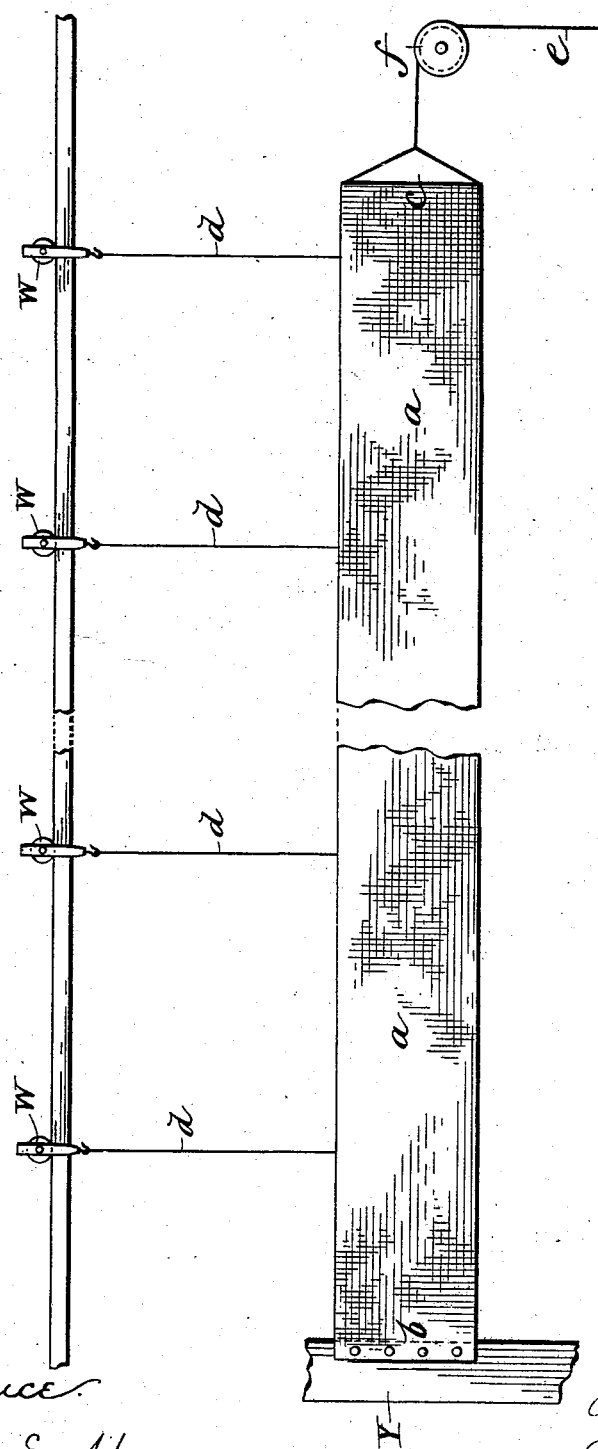
WITNESSES
INVENTOR

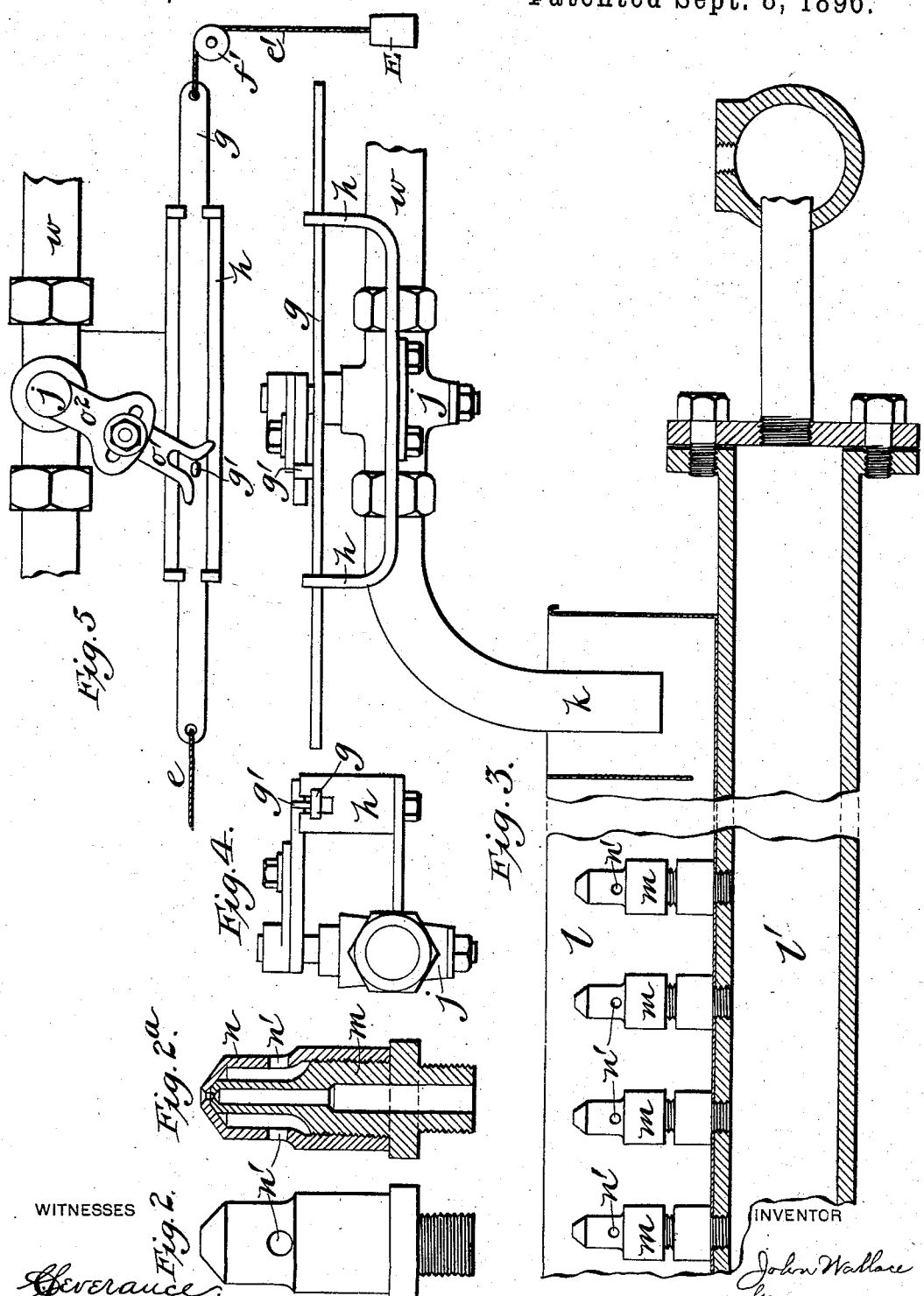

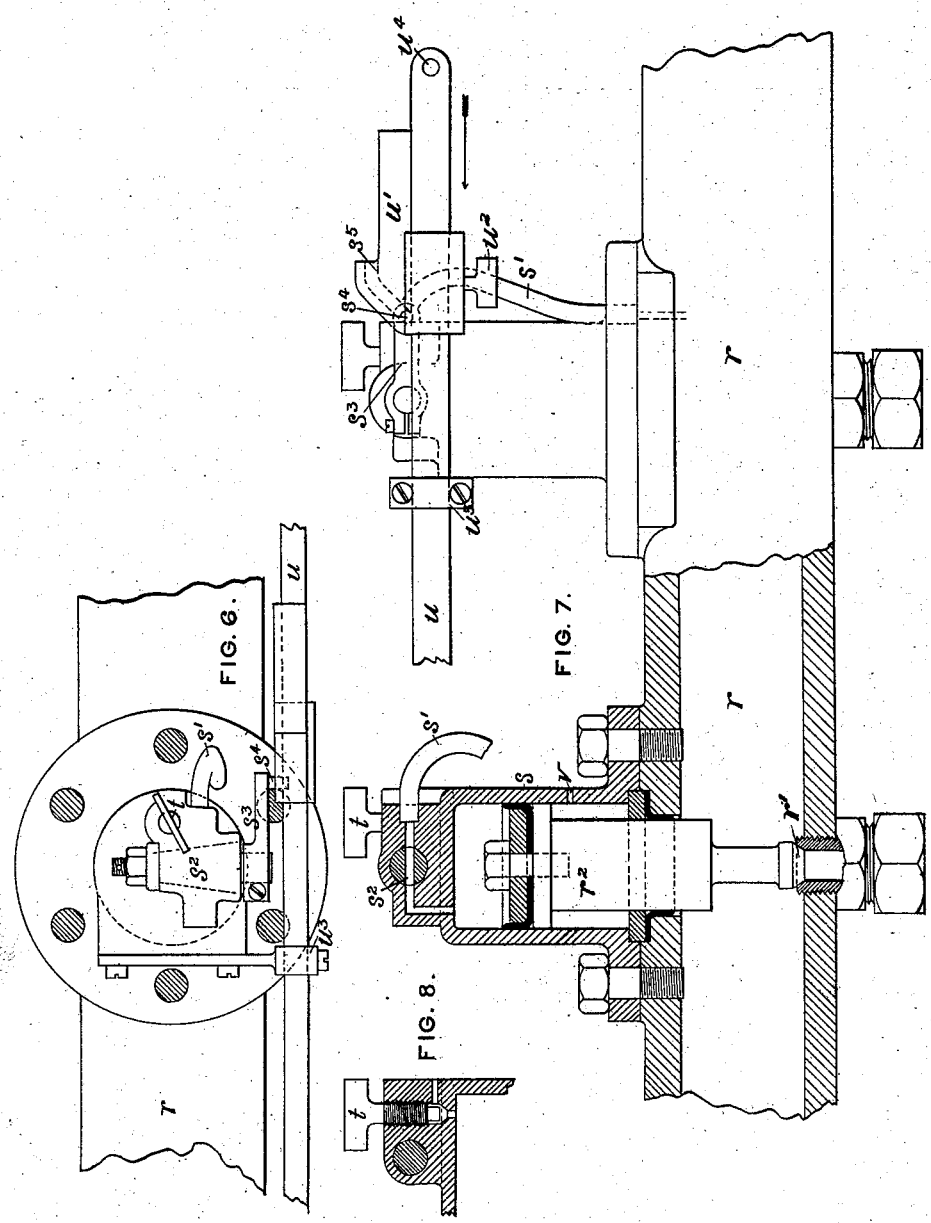

UNITED STATES PATENT OFFICE.

JOHN WALLACE, OF BOMBAY, INDIA.

HYGROSCOPIC REGULATOR FOR HUMIDIFIERS.

SPECIFICATION forming part of Letters Patent No. 567,209, dated September 8, 1896.

Application filed September 10, 1895. Serial No. 562,187. (No model.) Patented in England June 21, 1894, No. 12,003.

*To all whom it may concern:*

Be it known that I, JOHN WALLACE, civil engineer, a subject of the Empress of India, and a resident of 27 Medows Street, Fort, Bombay, India, have invented a certain Hygroscopic Regulator for Humidifiers, (for which I have obtained a British patent, No. 12,003, dated June 21, 1894,) of which the following is a specification.

My invention relates to improvements in apparatus for communicating moisture to the air of factories or other buildings at a rate which may be automatically controlled. In the humidifiers hitherto used the amount of moisture has been regulated by hand. As is well known, the natural humidity of the atmosphere varies, and in the manufacture of textile goods it is found necessary to augment the natural humidity by artificial means, because the fibrous materials used in such manufacture become hard or supple, brittle or pliant, according to the amount of moisture they absorb from the atmosphere. The natural humidity of the atmosphere varies not only at various seasons, but at different hours of the same day, and the object of my said invention is to utilize such natural variations for the purpose of automatically augmenting or diminishing the artificial supply of moisture to the air in order to keep the dampness of the air as uniform as possible. The effect of the humidity of the atmosphere upon vegetable or animal fibers and other substances, such as skin or leather, hair, parchment, and paper, is to produce movements of contraction or elongation, according to the particular kind or the particular form of the material used. I utilize such effect for controlling the admission of water to the air. To this end I suspend either in the room to be controlled or in the free atmosphere outside a fabric of suitable hygroscopic material of sufficient area to furnish by its movement the power necessary for operating the valves which admit the water, and so connect the said fabric with suitable water-valves that the supply of water or water-vapor shall be increased, diminished, or cut off, according as the hygroscopic fabric expands or contracts, and thereby prevent the air in the room from becoming too dry or too damp for the intended purpose. In some cases I increase the action of the material forming the hygroscopic regulator by incorporating therewith or saturating or impregnating it with absorbent or deliquescent salts or the like hygroscopic materials.

In order that my invention may be more clearly understood, I will describe the same with reference to the accompanying drawings.

In the drawings, Figure 1 represents a side elevation of a hygroscopic band and attachments forming part of the mechanism embodying my invention. Figs. 2 and $2^a$ represent, respectively, an elevation and a vertical central section of a nozzle used with said mechanism. Figs. 3, 4, and 5 represent, respectively, an end elevation, side elevation, and plan view of the cock and its controlling devices. Figs. 6 and 7 represent, respectively, a plan view and an elevation, partly in section, of the devices which I use with water under high pressure; and Fig. 8 represents a sectional detail view of a part of the same.

For controlling the humidity of the air in a room devoted to the manufacture of cotton, I prefer to use a hygroscopic regulator consisting of a band of closely-woven cloth which presents a large surface in proportion to the weight of the material it contains. I wish it, however, to be understood that my said invention is not restricted to the use of a cotton band, but I may employ bands, ropes, or webs or sheets of any suitable hygroscopic material. Such a band is shown at $a$ in Fig. 1. It is suspended by cords $d$ $d$ from rollers $w$, running on a horizontal bar or rail $x$, so that the alteration in length may take place freely. One end, $b$, of the band is fixed to a stationary support Y, Fig. 1. The band is kept in tension by means of a cord $e$, connected to the end $c$ and passing over a pulley $f$. The length and width of the band are proportioned to the work it has to perform and the degree of movement required to operate the valves. I find that a band varying from fifty to a hundred feet long by one to three feet wide, made of fine heald yarn closely woven, will give a sufficient pull to operate the valves in the manner as hereinafter described.

$g$ is a bar sliding in a bracket $h$ and connected with the cord $e$ in such a manner as to slide to and fro as the band $a$, Fig. 1, expands and contracts, and thus to turn the plug of the water-cock $j$, which regulates the outflow of water from the pipe $k$ into a water-trough $l$, in which the jet-nozzles $m$ are situate. Each jet is screwed into the air-pipe $l'$, into which a supply of compressed air is forced by a blower fan or pump. Each jet-nozzle $m$ has an adjusting-cap $n$ screwed thereon, perforated concentrically. The cap $n$ has lateral perforations $n'$ for the admission of water. The orifice of the jet is formed at the junction of two cones, so as to give the escaping air as much lateral spread as possible. When the water in the trough $l$ stands above the level of the orifice $n'$ and the cap $n$ is slightly raised, the escaping jet of air produces a partial vacuum under the cap, whereby water rises through the cap and is broken into a fine spray or mist by the action of the compressed-air jet. In practice the trough $l$ is placed in a chamber of suitable size, through which the whole supply of air to be moistened is caused to pass by the ventilating-fan, and whence it is conveyed to the intended room through suitable distributing-pipes.

The regulator sliding bar, operated, as hereinbefore set forth, by a cord or wire $e$, is provided with a pin $g'$, which enters the jaws of the lever $o'$, loosely mounted on the spindle of the cock $j$. An adjusting-quadrant $o^2$, rigidly secured to the spindle of the cock $j$, enables the final adjustment of the position of the cock with relation to the slide-bar $g$ to be effected. The slide-bar $g$ gives to the lever $o'$ a certain fixed movement from zero to full supply; but if the movement of the regulator $a$, Fig. 1, should exceed this range the pin $g'$ will leave the jaws of the lever $o'$ and travel freely beyond in either direction. On returning, it engages with the jaws again. The farther end of the slide-bar $g$—i. e., that not connected to the regulator-cord $e$—is attached to a spring or retracting device $g^2$, as shown in Figs. 3 and 5, to keep the connections with the regulator $a$ in tension.

When water of high pressure is used for spray-producing, the opening and closing of the supply-valves is liable to offer a variable resistance, which interferes with the steady working of the band $a$. In such cases I employ the device shown in Figs. 6, 7, and 8 to enable the water supply to be controlled by the band $a$. In said figures, $r$ is the high-pressure water-pipe, which supplies water at high pressure to groups of spray-jets through valves $r'$. The valve $r'$ forms part of a piston $r^2$, working in the cylinder $s$ and having ends of differing area, as shown. The pipe $s'$ supplies water from the main pipe $r$, through the cock $s^2$, to the head of the piston $r^2$, which, by reason of its greater area, closes the valve $r'$. A valve $t$, when slightly open, allows a constant leakage of a small amount of water to take place from the top of the cylinder $s$.

If now the cock $s^2$ be gradually closed until its supply is less than the leakage through the valve $t$, the piston $r^2$ will rise and open the valve $r$, and conversely if the cock $s^2$ is opened to admit water in excess of the leakage through the valve $t$ the piston will descend and close the valve $r'$. For regulating the high-pressure water supply I limit the work of the band $a$, Fig. 1, to the opening and closing of the cocks $s^2$. Each valve $r'$ supplies a fourth or a fifth of the total water supply needed by the spray apparatus, and they are placed sufficiently near each other to be connected by means of a sliding rod $u$ common to all the valves.

The cock $s^2$ is operated by means of a small crank $s^3$, the pin $s^4$ of which takes into a groove $s^5$ in the piece $u'$. The piece $u'$ slides on the rod $u$ and provides a path for the crank-pin $s^4$, and can be fixed to the rod $u$ by the thumb-screw $u^2$. The rod $u$ is carried by brackets $u^3$ and is connected at $u^4$ by means of a cord or wire to the band $a$, Fig. 1, so as to transmit the movements of the latter. Figs. 6 and 7 show the cock $s^2$ full open and the valve $r'$ shut. If now the increasing dryness of the air elongates the band, the movement of the rod $u$ in the direction of the arrow will carry the piece $u'$ along with it, and, raising the crank-pin $s^4$ in the dotted groove $s^5$, will close the cock. The leakage from the valve $t$ will then release the piston $r^2$ and open the valve $r'$. A small hole at $v$ puts the unused part of the cylinder $s$ in communication with the atmosphere. A reverse movement takes place on the contraction of the band by the absorption of moisture. By a suitable adjustment of the pieces $u'$ on the bar $u$ the valves may be caused to open in succession, and thus insure a very steady control of the humidity of the atmosphere in any room. Various other means other than those shown may be employed for utilizing the expansion and contraction of the regulator-band $a$. For instance, it may be caused to make and break the current passing through one or more electromagnets controlling a balanced water-valve.

It is to be understood that the number of valves or jets or their arrangement with regard to each other may be varied to suit the requirements of each particular case to which my invention may be applied.

What I claim as my invention, and desire to secure by Letters Patent, is—

1. An elongated piece of hygroscopic material having one end fixed and the other free to move, in combination with a water-pipe arranged to supply moisture to the apartment in which the said hygroscopic material is located, a valve in the said pipe and connections between the said valve and the said free end of such material, in order that the contraction of the latter as it dries may open the said valve and thus automatically moisten the air of the apartment again substantially as set forth.

2. In combination with a valve or cock governing the supply of water to an apartment, a sliding bar operating the said valve, a retracting device attached to one end of the said bar, a piece of fabric fixed at one end within the said apartment and a connection between the free end of the said piece of fabric and the said bar, in order that the contraction of the fabric in drying may automatically admit moisture to the apartment and keep its condition constant in this respect substantially as set forth.

In testimony whereof I have signed my name to this specification in the presence of two subscribing witnesses.

JOHN WALLACE.

Witnesses:
JEHARGIR M. RUTNAGUR,
W. ANDERSON.